United States Patent [19]

Firth

[11] 4,396,447
[45] Aug. 2, 1983

[54] APPARATUS AND METHOD TO MAINTAIN POSITIVE SEPARATION OF REACTIVE BANDS

[75] Inventor: Francis G. Firth, Los Angeles, Calif.

[73] Assignee: Applied Plastics Co., Inc., El Segundo, Calif.

[21] Appl. No.: 367,073

[22] Filed: Apr. 9, 1982

[51] Int. Cl.³ .............................................. B31F 1/00
[52] U.S. Cl. ..................................... 156/201; 53/450; 53/456; 53/548; 53/553; 53/558; 53/559; 53/244.22; 53/289; 53/292; 53/461; 53/467
[58] Field of Search ........ 156/289, 292, 582, 201–202, 156/204, 461, 462, 467, 244.22; 53/450, 545, 546, 548, 553, 456, 558–559

[56] References Cited

U.S. PATENT DOCUMENTS

| | | | |
|---|---|---|---|
| Re. 30,843 | 1/1982 | Flint | 156/330 |
| 2,374,504 | 4/1945 | Salfisberg | 156/582 X |
| 2,384,492 | 9/1945 | Rebechini | 53/558 X |
| 2,827,742 | 3/1958 | Bursak | 53/548 X |
| 2,971,305 | 2/1961 | Webster et al. | 53/546 X |
| 3,020,687 | 2/1962 | Joa | 53/553 X |
| 3,025,194 | 3/1962 | Adams | 156/201 |
| 3,708,379 | 1/1973 | Flint | 428/58 |
| 3,837,981 | 9/1974 | Flint | 156/330 |
| 4,116,742 | 9/1978 | Firth | 156/289 |

Primary Examiner—David A. Simmons
Attorney, Agent, or Firm—William W. Haefliger

[57] ABSTRACT

A method of packaging first and second kneadable plastic masses that react when mixed includes
  (a) providing the masses in lengthwise elongated strip form and traveling the masses lengthwise in parallel relation but with a predetermined gap therebetween,
  (b) providing an elongated first plastic film that defines a barrier and traveling that film in the direction of travel of the masses,
  (c) and urging the traveling film toward the traveling masses to contact same and to locate the barrier in the gap.

The film may have side sections simultaneously urged against surfaces of the traveling masses; a second traveling film beneath the masses may be contacted by the barrier; and end portions of the first film may be heat sealed to the second film to encapsulate the masses.

15 Claims, 10 Drawing Figures

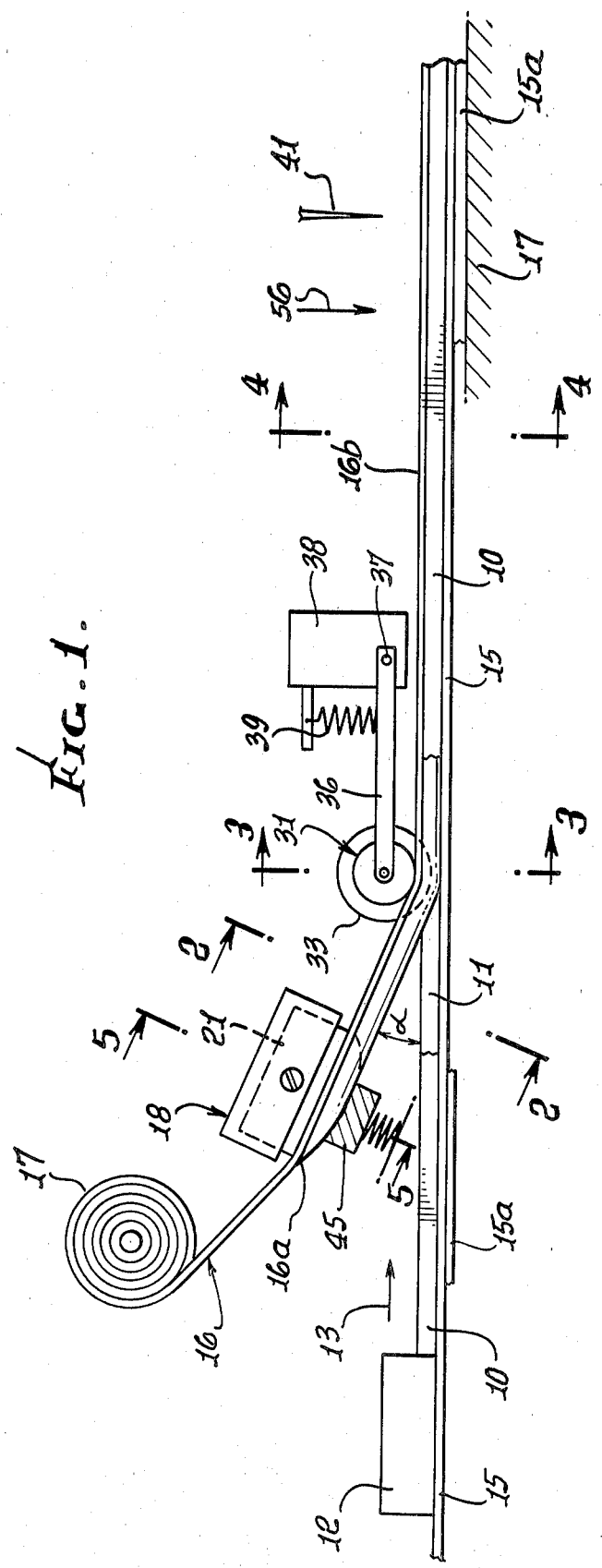
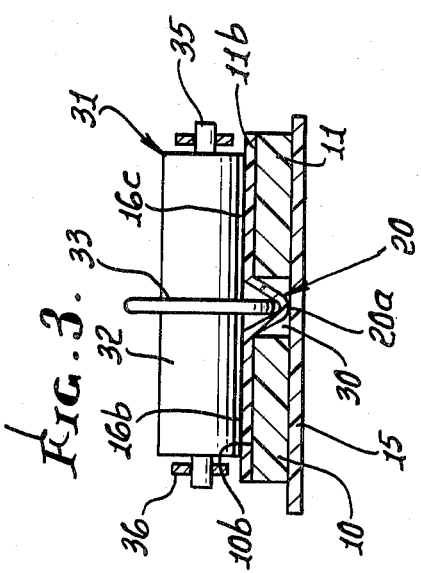
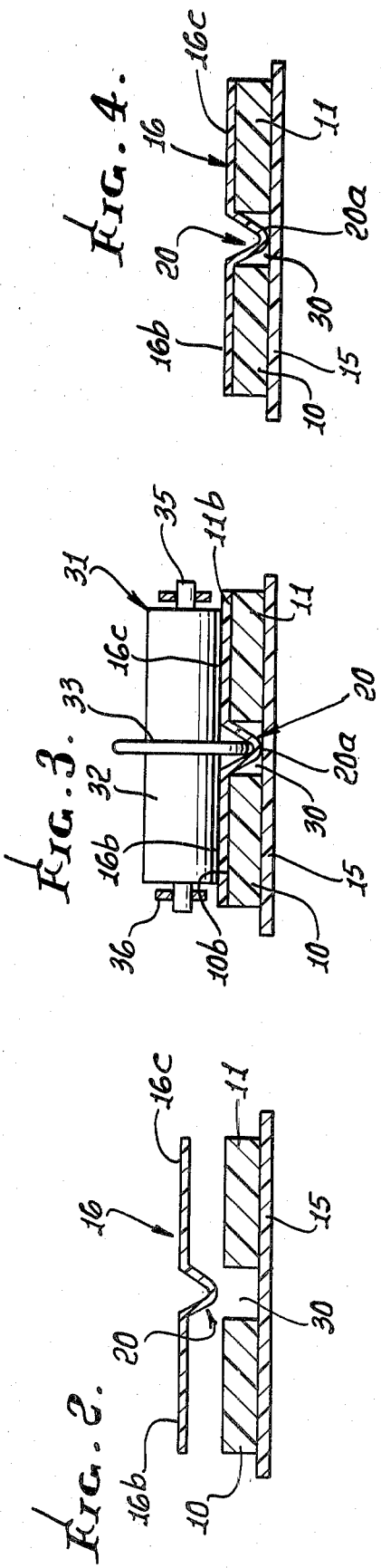
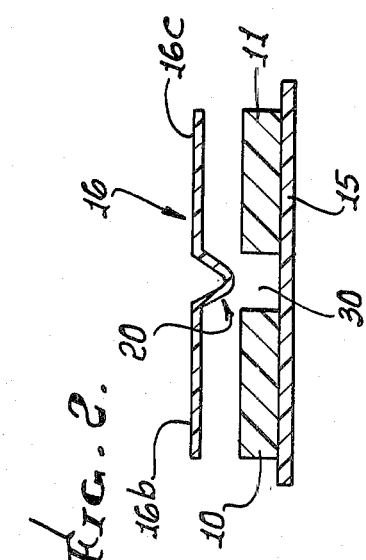

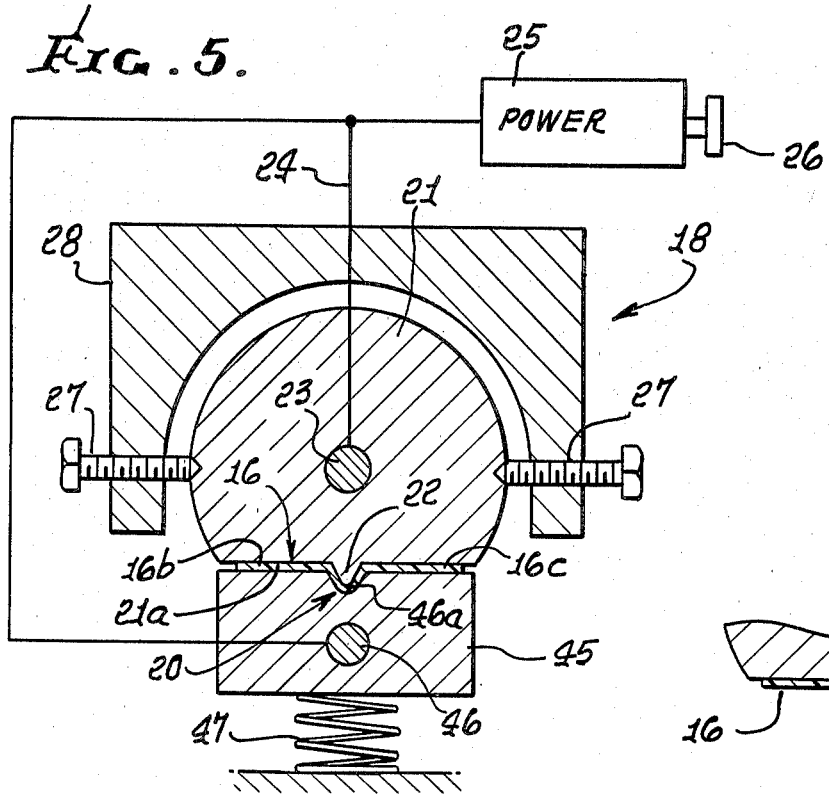
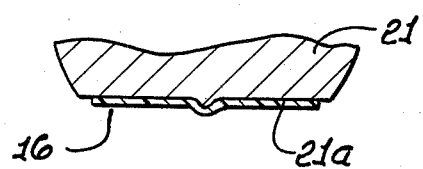
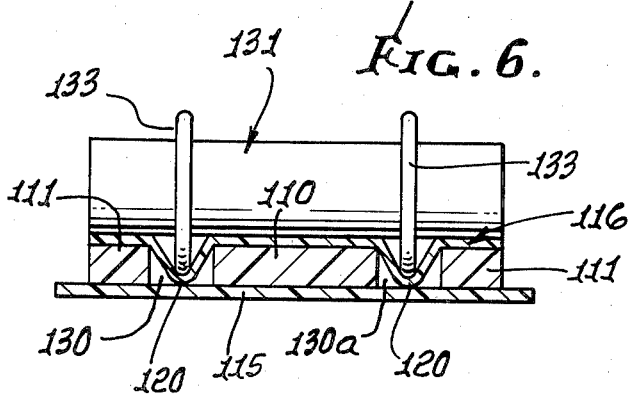
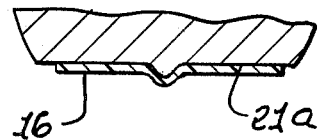
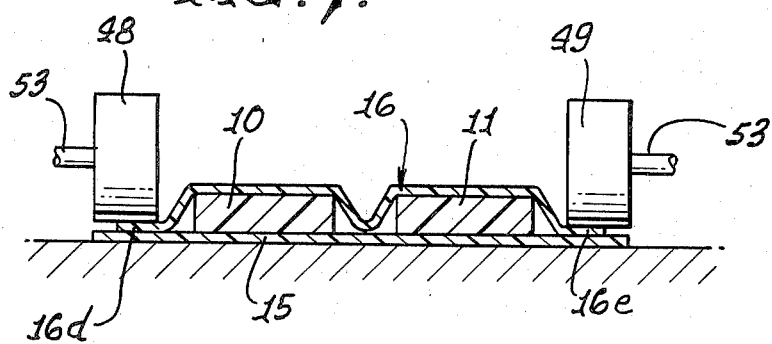

APPARATUS AND METHOD TO MAINTAIN POSITIVE SEPARATION OF REACTIVE BANDS

BACKGROUND OF THE INVENTION

This invention relates generally to packaging of reactive materials, and more particularly concerns the provision of a barrier or barriers between reactive masses, as during extrusion thereof, to block their reaction until such time as they are intermixed, as by kneading.

When two or more thickened, heavy pastes or putty-like masses are laid, placed or extruded adjacent one another, but not in contact, protection against unintentional touching may be required. For positive protection, it is desired that a thin film of plastic material project between the masses, the film preferably being part of or formed by one strip or sheet of the film. This presents problems of barrier formation, barrier insertion into a gap between the masses, and barrier retention in the gap.

SUMMARY OF THE INVENTION

It is a major object of the invention to provide method and means to accomplish formation of a barrier on a single sheet or film of plastic material, to effect positive insertion and retention of the barrier in the gap between the masses, and to effect positive retention of the barrier in the gap despite the lack of filling of the gap by the barrier.

The basic method of the invention involves:

(a) providing the masses in lengthwise elongated strip form and traveling the masses lengthwise in parallel relation but with a predetermined gap therebetween, (b) providing an elongated first plastic film that defines a barrier, and traveling said film in the direction of travel of the masses, (c) and urging the traveling film toward the traveling masses to contact same and to locate the barrier in said gap.

As will appear, the barrier may be formed to have V-shape; the urging step may include progressively deflecting the V-shaped barrier into the gap as by rollably engaging a roller fin with the barrier; and the film has side sections rollably urged into adhering engagement with the typically tacky masses at the time that the barrier is fully inserted into the gap, to retain the barrier in the gap even though the barrier does not fill the gap. Full insertion may include engagement of the barrier crest with an undersupporting plastic film, as will appear.

The first film heating and forming means may include a heated metallic support having a forming fin projecting therefrom to receive heat from the support, the fin located to be engaged by the traveling film for heating the film and progressively forming the barrier. In addition a heated slot may be employed under the film and fin to maintain film flatness except for the formed barrier.

Finally, the formation of multiple barriers, and their insertion into multiple gaps between multiple masses, are contemplated.

These and other objects and advantages of the invention, as well as the details of an illustrative embodiment, will be more fully understood from the following specification and drawings, in which:

DRAWING DESCRIPTION

FIG. 1 is a side elevation showing apparatus embodying the invention;

FIGS. 2–5 are enlarged sections taken on lines 2—2, 3—3, 4—4 and 5—5 of FIG. 1;

FIGS. 5(a)–5(c) are fragmentary sections showing progressive formation of the barrier; and FIGS. 6–7 show modifications.

DETAILED DESCRIPTION

In FIGS. 1–5, multiple kneadable plastic masses extend in lengthwise elongated strip or band form, with a gap or gaps therebetween, the masses also being traveled lengthwise. See for example masses 10 and 11 which may have the compositions disclosed in U.S. Pat. No. 4,116,742 so that they react when kneaded, i.e. mixed, and they are typically provided by extrusion with putty-like consistency. For example, the compositions of the two bands 10 and 11, after suitable additions of bulking fillers may be as follows:

| BAND 10 | BAND 11 (Curing agent) |
| --- | --- |
| epoxy resin | polyfunctional amine |
| polyisocyanate | polyol and catalyst |
| phenolic resin | acidic catalyst |
| unsaturated elastomers (rubber) | peroxides and plasticizers |

As shown in FIG. 1, the masses are extruded at 12 to travel rightwardly (see arrow 13), and to have a predetermined narrow gap 30 therebetween (see FIGS. 2–4). They may be typically supported on a suitable film 15 (referred to otherwise herein as a "second" film), traveling rightwardly on a belt 15a, which may be configured as endless and traveling in a looped path. A belt support appears at 17.

Another (i.e. "first") plastic film 16 typically transparent and thermoplastic, is supplied as at 17 to travel in the general direction of the masses, that film approaching at 16a a means 18 for heating and forming (or deforming) the film to define a barrier 20 that projects with V-shape, in cross section. See FIG. 2, for example.

As shown in FIGS. 1 and 5, the means 18 includes a heated metallic support or mandrel 21 having an integral forming fin 22 projecting therefrom to receive heat inflow from the support 21. See for example the Cal Rod 23 in the support 21 supplied with electrical current at 24 from a suitable power source 25, adjustable at or by knob 26. Thus, the fin 22 is suitably heated at all times to engage and form the barrier 20 in film 16. The support 21 is laterally adjustable as by set screws 27 carried in holder 28, to widthwise control the position of the barrier on the film strip 16. Note in FIGS. 5(a)–5(c) that the thermoplastic film 16 engages the underside 21a of mandrel 21, including fin 22, to receive heat therefrom, and progressively form the barrier to full height. To this end, the fin 22 projects to increasing extent from the bottom of the mandrel, in the direction of film travel, to progressively form the barrier. A lower forming die 45, heated at 46, defines a slot 46a to receive barrier 20 and fin 22. It engages and transfers heat to the film side sections 16b and 16c to maintain them horizontally flat as barrier 20 is formed. Spring 47 urges die 45 toward the film 16.

Means is also provided to urge the traveling film toward the masses 10 and 11 to contact same and to progressively locate the barrier in the gap or gapping 30 between the masses. In this regard, the film 16 has side sections 16b and 16c that project sidewardly from the barrier 20. The urging means is shown in the form of a roller 31 having annular surfaces 32 to rollably engage the film side sections as seen in FIG. 3, pressing them against the top surfaces 10b and 11b of the masses 10 and 11. At the same time, an annular fin 33 on the roller enters the V-shaped barrier 20 and urges it into the gap 30, and to the extent that the tip or crest 20a of the barrier is urged close to the sheet 15, and typically contacts same, as shown in FIGS. 3 and 4. Fin 33 precisely orients the film positions. Adhesion of film sections 16b and 16c to the top surfaces of the masses assures that the barrier 20 will remain in position, as shown, along the length of the gap, the barrier not filling the gap, latterly.

FIG. 1 also shows the roller as having trunnions 35 supported by levers 36, pivoted at 37 to a support or carrier 38. A spring or springs 39 yieldably urge the roller downwardly, as by their location between lever or levers 36 and a part 40 fixed to carrier 38. The roller rotates and urges the film 16 as described in response to its spring urged contact with the film traveling rightwardly as shown. This is further assured by the angularity α of approach of the film 16 to the roller. A knife 41 cuts off sections of the masses, at desired length.

FIG. 6 shows a modification in which a roller 131 carries two annular fins 133, axially spaced apart to enter between two barriers 120 on the film 116. The barriers are urged downwardly into two gaps 130 and 130a, to contact supporting film 115. Three reactive masses 110 and 111 as shown, form the gaps or gapping. Mass 110 corresponds to mass 10, and masses 111 corresponds to mass 111, divided into two components and placed as shown to reduce the reaction time upon kneading or mixing.

FIG. 7 shows heated rollers 48 and 49 pressing film 16 edge portions 16d and 16e onto the lower film 15, which may also be thermoplastic. Edge portions 16d and 16e are thereby bonded to the lower film 15, to form an encapsulating assembly for the masses 10 and 11, obviating need for a separate bubble pack. Cal Rods to heat the rollers appear at 53, although other heaters are usable. Rollers 48 and 49 may be located at arrow 56 location, in FIG. 1. Such bonding and roller 31 urging of the barrier 20 may be carried out simultaneously.

I claim:

1. The method of packaging first and second kneadable plastic masses that react when mixed, that includes
   (a) providing the masses in lengthwise elongated strip form and traveling the masses lengthwise in parallel relation but with a predetermined gap therebetween,
   (b) providing an elongated first plastic film that defines a barrier and traveling said film in the direction of travel of the masses, said film being thermoplastic and including the step of preliminarily heating and forming the film to define said barrier to have V-shape, with side sections, in cross section,
   (c) thereafter urging the traveling formed film toward the traveling masses to contact same and to locate the barrier in said gap, said urging including providing an annular fin on a roller and resiliently urging the fin into the groove defined by said V-shape, and
   (d) providing and traveling a second elongated plastic film in under supporting relation with said masses, the first plastic film being urged downwardly toward the masses so that the film side sections are urged against the masses at the same time that the barrier is urged downwardly in the gap to contact the second film.

2. The method of claim 1 wherein said urging step includes progressively deflecting said V-shaped barrier into said gap.

3. The method of claim 1 wherein said heating and forming of the film is effected by providing a heated metallic support having a fin projecting therefrom to receive heat from the support, and locating the fin to be engaged by the traveling film for heating the film and progressively forming said barrier.

4. The method of claim 3 including adjusting said support to locate said fin widthwise of the traveling film.

5. The method of claim 1 including bonding edge portions of the first film onto said second elongated plastic film extending beneath the masses thereby to encapsulate said masses.

6. The method of claim 5 including employing heating rollers to engage said edge portions and effect said bonding.

7. Apparatus for packaging multiple kneadable plastic masses that react when mixed, the masses provided in elongated strip form traveling lengthwise in parallel relation but with predetermined gapping therebetween, said apparatus comprising
   (a) means for traveling an elongated first plastic film in the direction of the masses, the film defining a projecting barrier, said film being thermoplastic, and including means for heating and forming the film to define said barrier to have V-shape in cross section,
   (b) and means for thereafter urging the traveling formed film toward the traveling masses to contact same and to progressively locate the barrier in said gapping, said means including a roller defining a fin received in the V-shape formed by the film.

8. The apparatus of claim 7 wherein said film has side sections that project sidewardly from said barrier, and said (b) means includes roller annular surfaces to engage the film side sections in response to said travel of the film and masses.

9. The apparatus of claim 7 including a second plastic film extending in under supporting relation with the masses, and the roller fin projects into the gap and between V-shaped walls defined by the barrier to urge the barrier against the second film at the same time that the roller annular surfaces urge the first film side sections against upper surfaces of the masses.

10. The apparatus of one of claims 7, 8 and 9 including means yieldably urging the roller toward the traveling first film and masses.

11. The apparatus of claim 10 wherein said last named means comprises a spring, and including a swingable support for the roller.

12. The apparatus of claim 7 wherein said (b) means includes a heated metallic support having a forming fin projecting therefrom to receive heat from the support, the fin located to be engaged by the traveling film for heating the film and progressively forming the barrier.

13. The apparatus of claim 12 including adjustable means engaging the support for adjusting its position to locate the forming fin widthwise of the traveling film.

14. The apparatus of claim 7 wherein the film defines a second projecting barrier spaced from the first mentioned barrier, and the roller has a second annular fin engaging the second barrier.

15. The apparatus of claim 7 including means for bonding edge portions of said film to a supporting layer, to encapsulate said masses.

* * * * *